(No Model.) 10 Sheets—Sheet 1.

W. J. BARRON.
TYPE WRITING MACHINE.

No. 576,247. Patented Feb. 2, 1897.

WITNESSES

INVENTOR.
Walter J. Barron.
Per Edwin W. Brown.
Attorney.

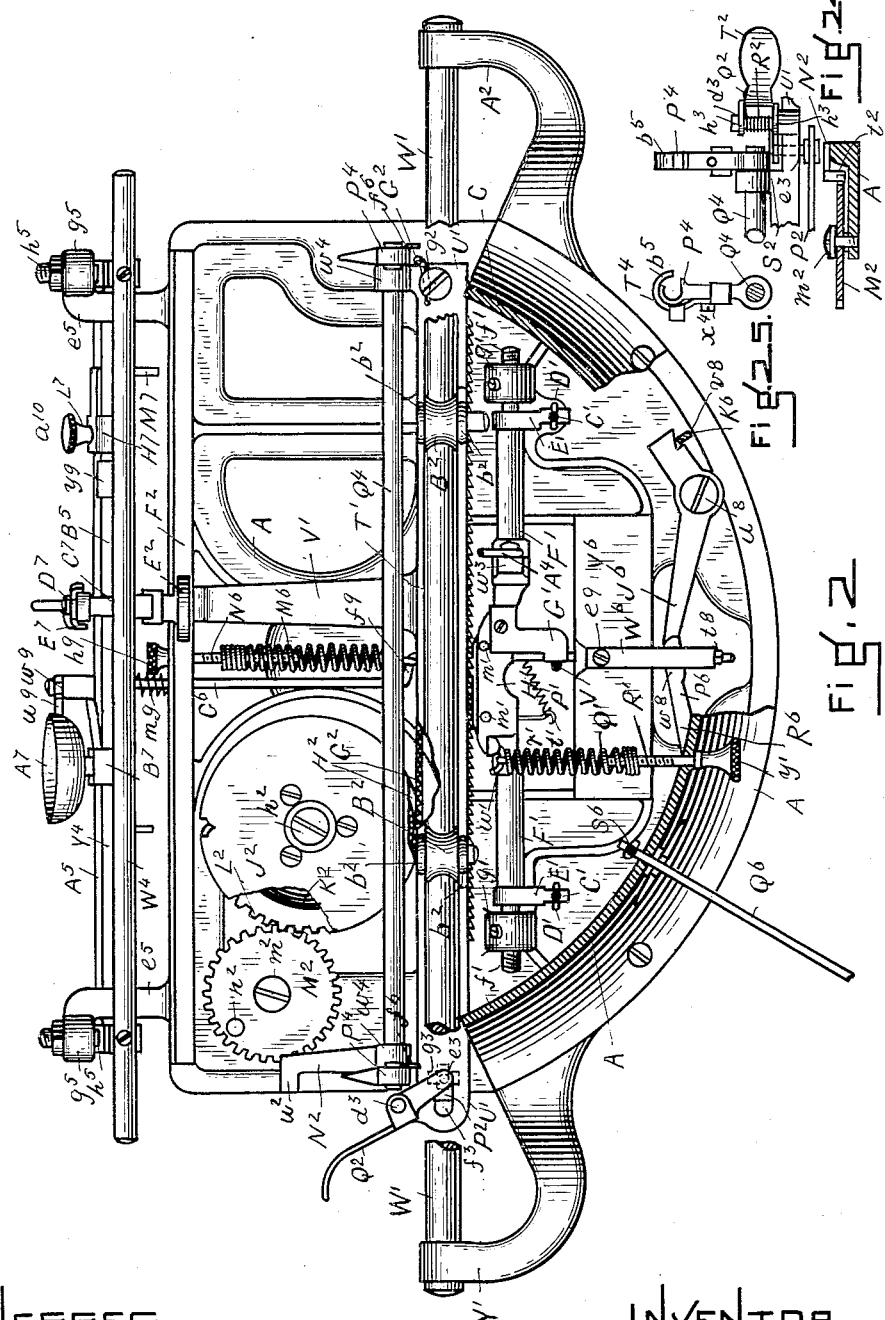

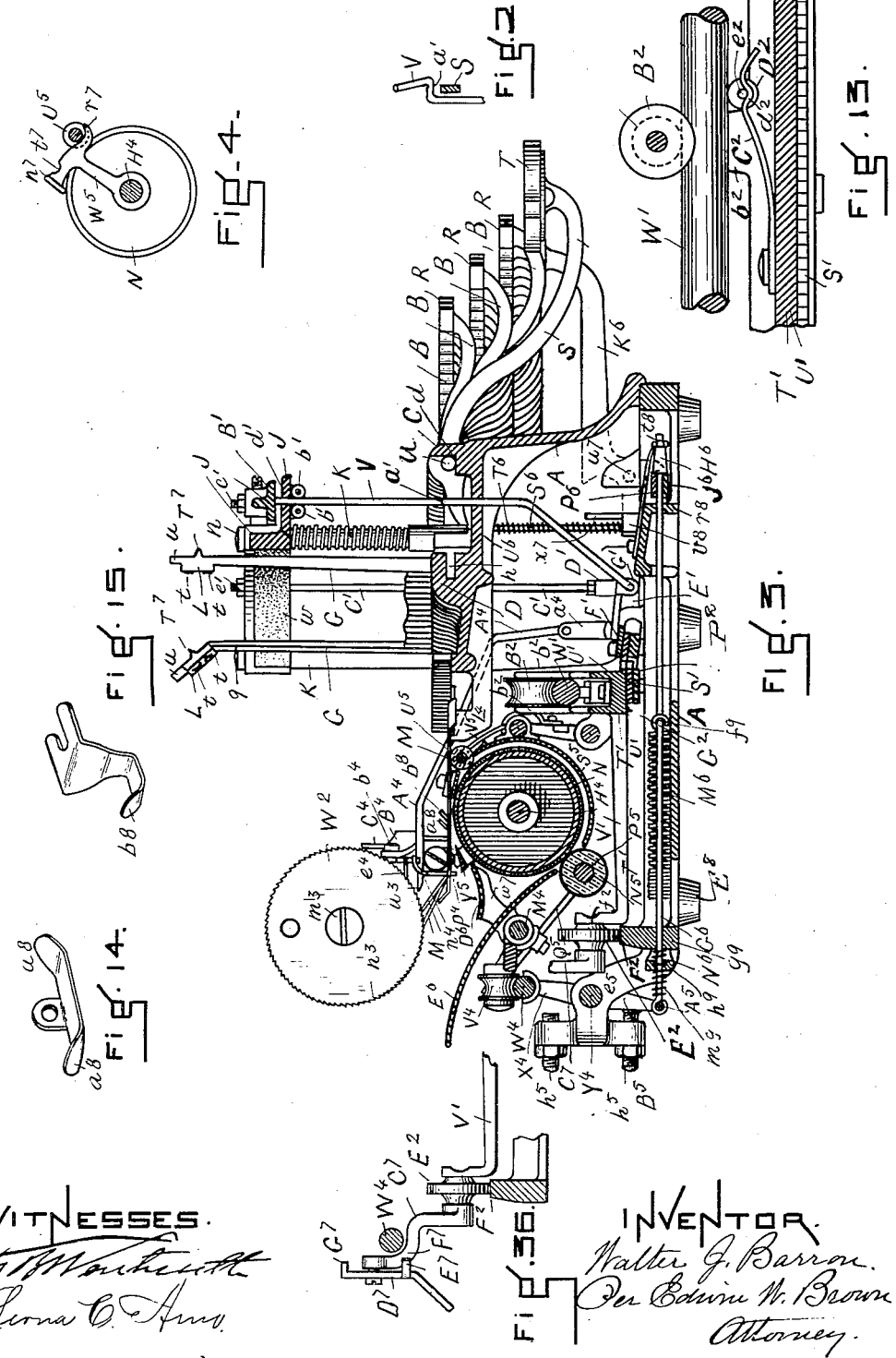

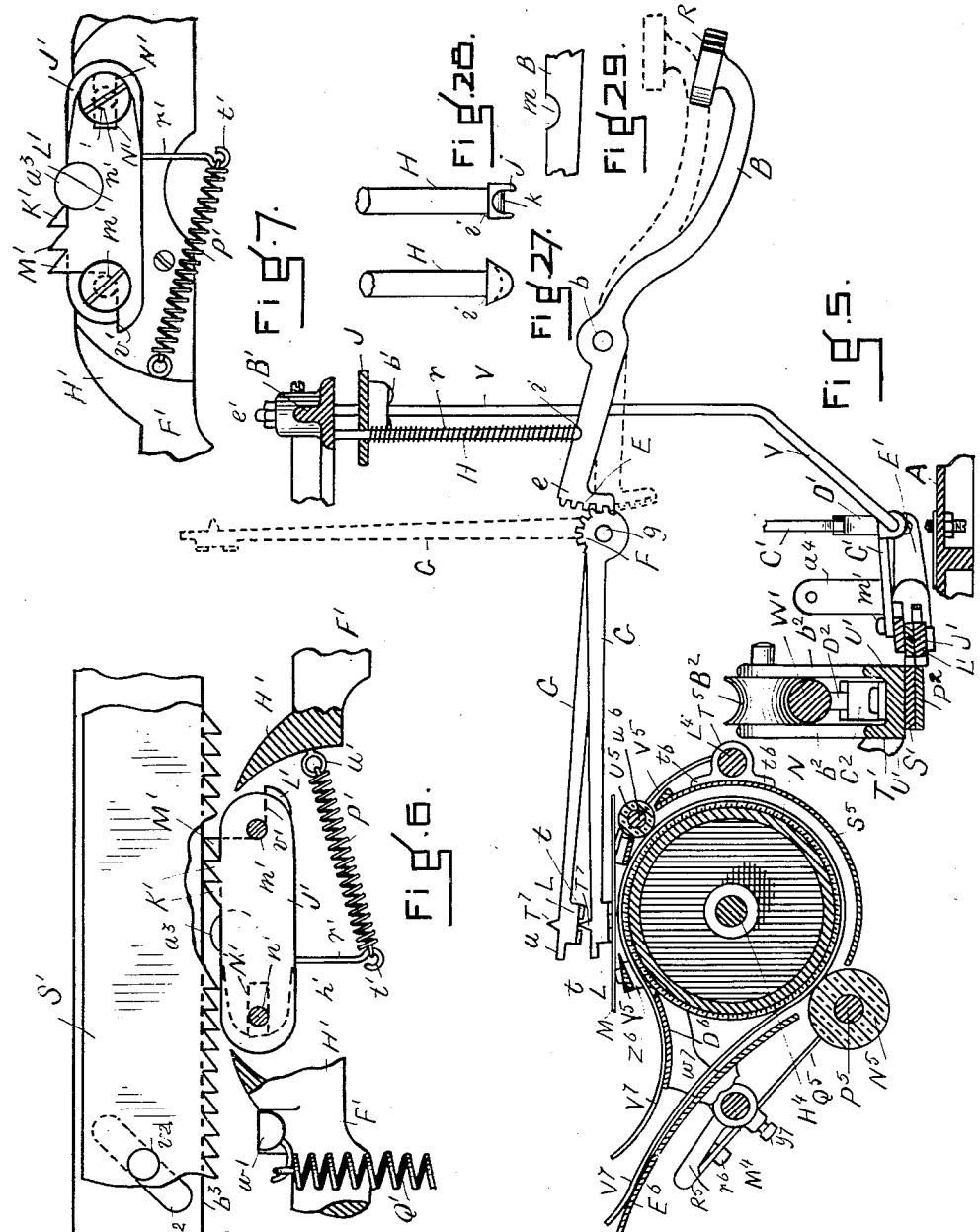

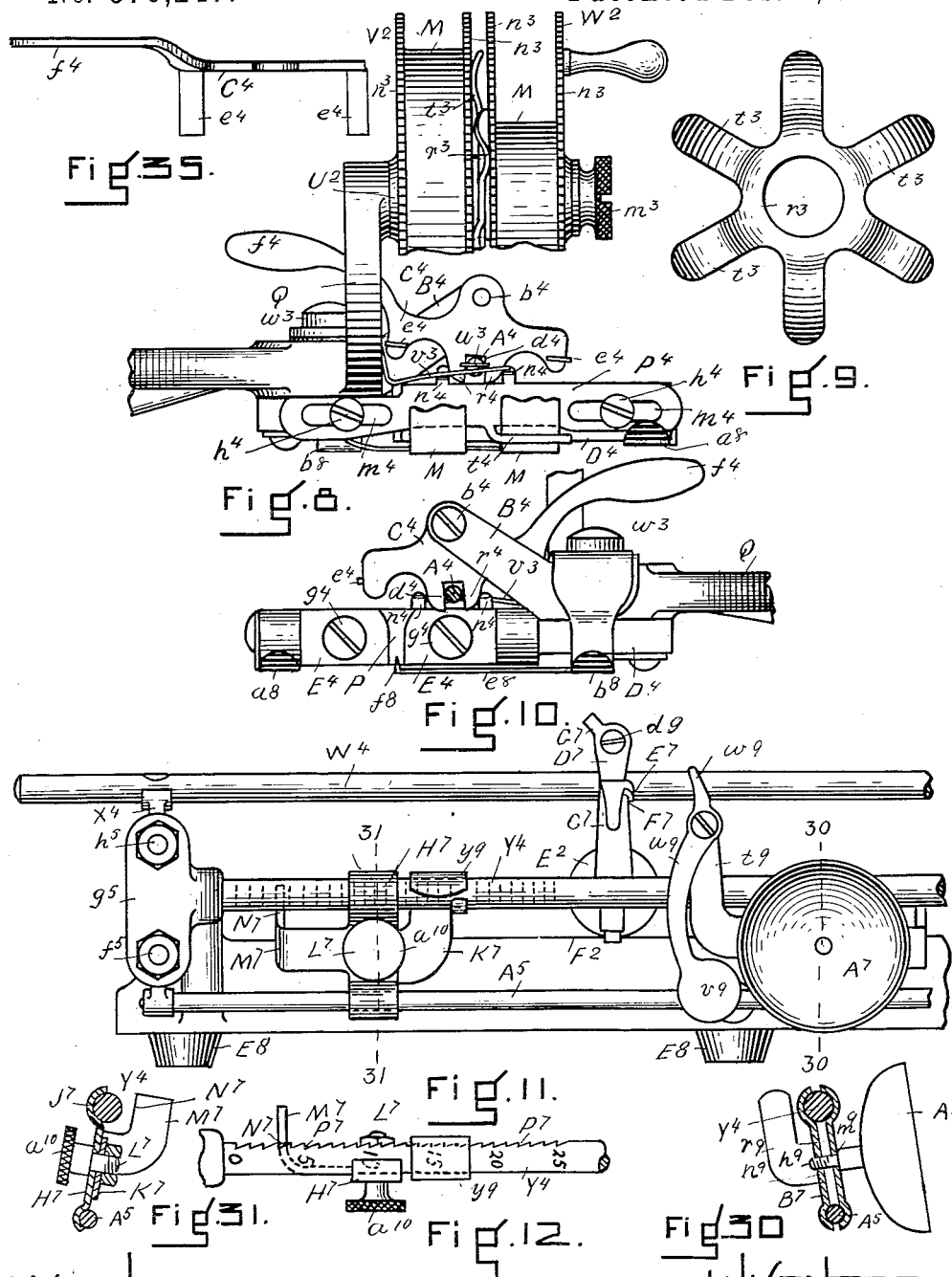

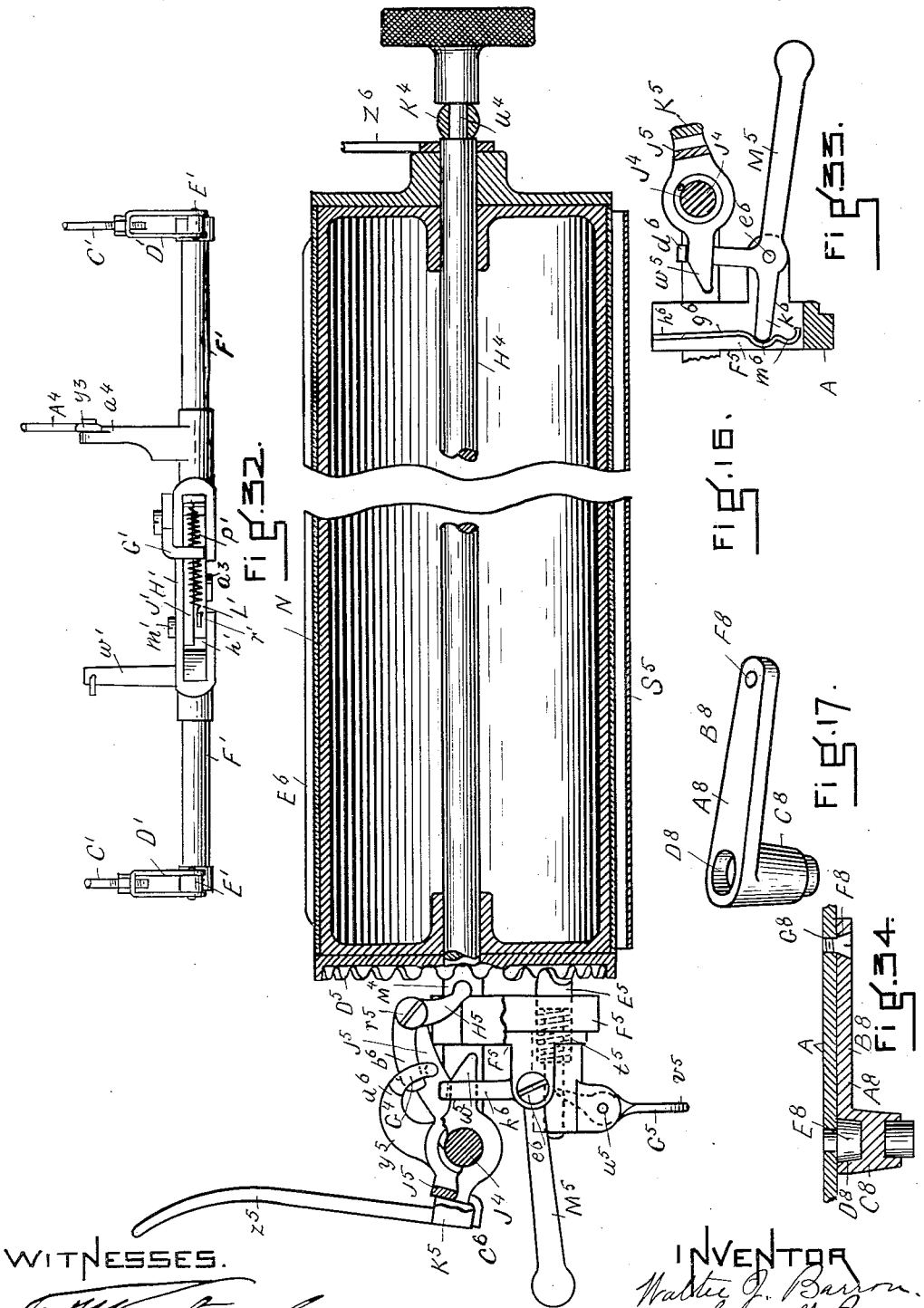

(No Model.) 10 Sheets—Sheet 7.
W. J. BARRON.
TYPE WRITING MACHINE.
No. 576,247. Patented Feb. 2, 1897.
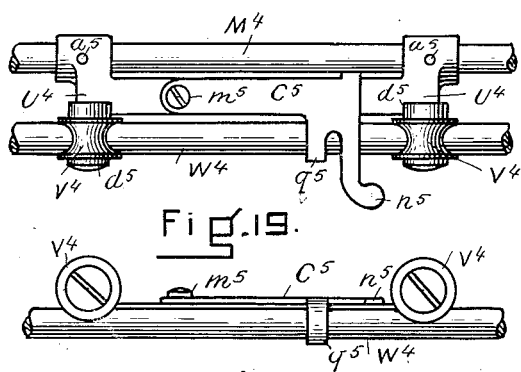
Fig.19.
Fig.20.
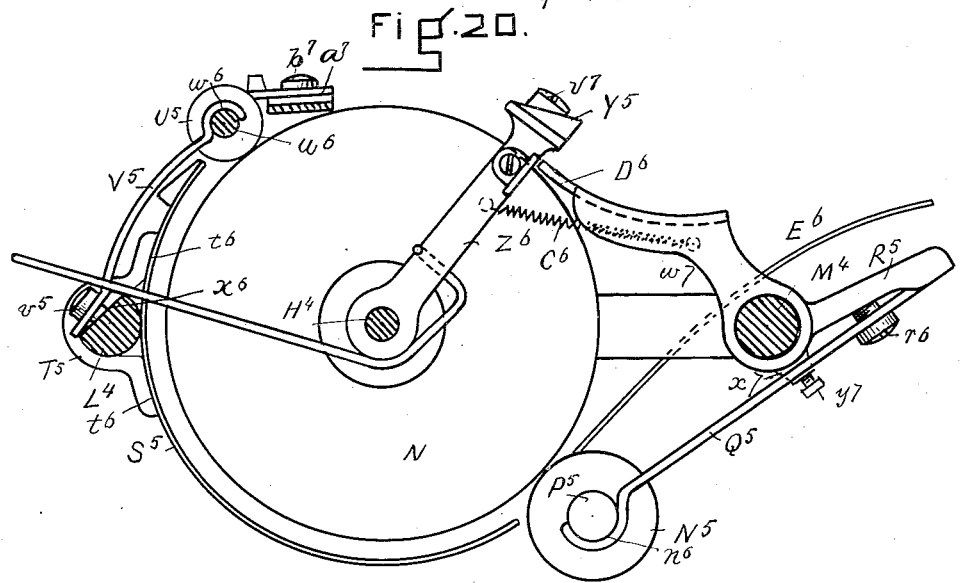
Fig.18.
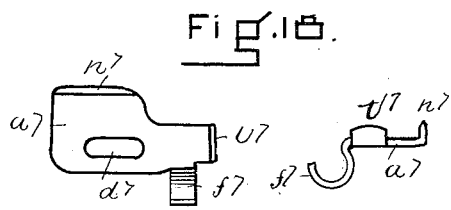
Fig.23.
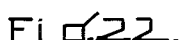
Fig.21.   Fig.22.
WITNESSES                       INVENTOR.

(No Model.) 10 Sheets—Sheet 8.

W. J. BARRON.
TYPE WRITING MACHINE.

No. 576,247. Patented Feb. 2, 1897.

WITNESSES.
Leona C. Truro.
Chester Marr.

INVENTOR
Walter J. Barron,
Per Edwin W. Brown
Attorney.

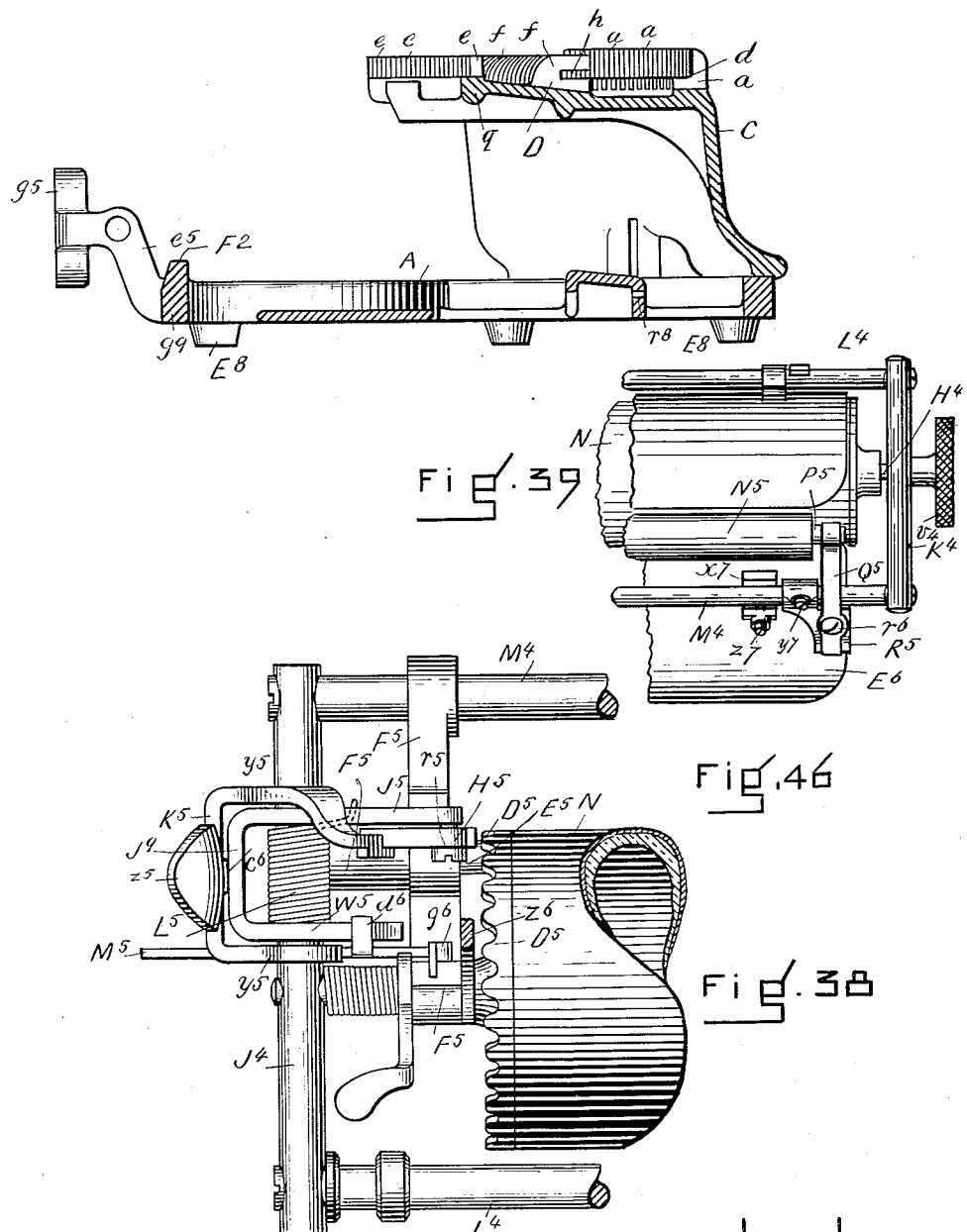

(No Model.)  
10 Sheets—Sheet 10.

W. J. BARRON.
TYPE WRITING MACHINE.

No. 576,247.  Patented Feb. 2, 1897.

Witnesses  
Inventor  
Walter J. Barron,  
Per Edwin W. Brown.  
Attorney

UNITED STATES PATENT OFFICE.

WALTER J. BARRON, OF BROOKLYN, NEW YORK, ASSIGNOR TO THE FRANKLIN TYPEWRITER MANUFACTURING COMPANY, OF MAINE.

TYPE-WRITING MACHINE.

SPECIFICATION forming part of Letters Patent No. 576,247, dated February 2, 1897.

Application filed April 10, 1893. Serial No. 469,778. (No model.)

*To all whom it may concern:*

Be it known that I, WALTER J. BARRON, of Brooklyn, in the county of Kings and State of New York, have invented certain new and useful Improvements in Type-Writing Machines, of which the following is a full, clear, and exact description.

This invention relates to improvements in type-writing machines, and more especially to the type-writing machine called the "Franklin;" and the invention consists of a type-writing machine constructed and arranged for operation all substantially as hereinafter fully described, reference being had to the accompanying sheets of drawings, in which is illustrated a type-writing machine constructed in accordance with this invention.

Figure 1:
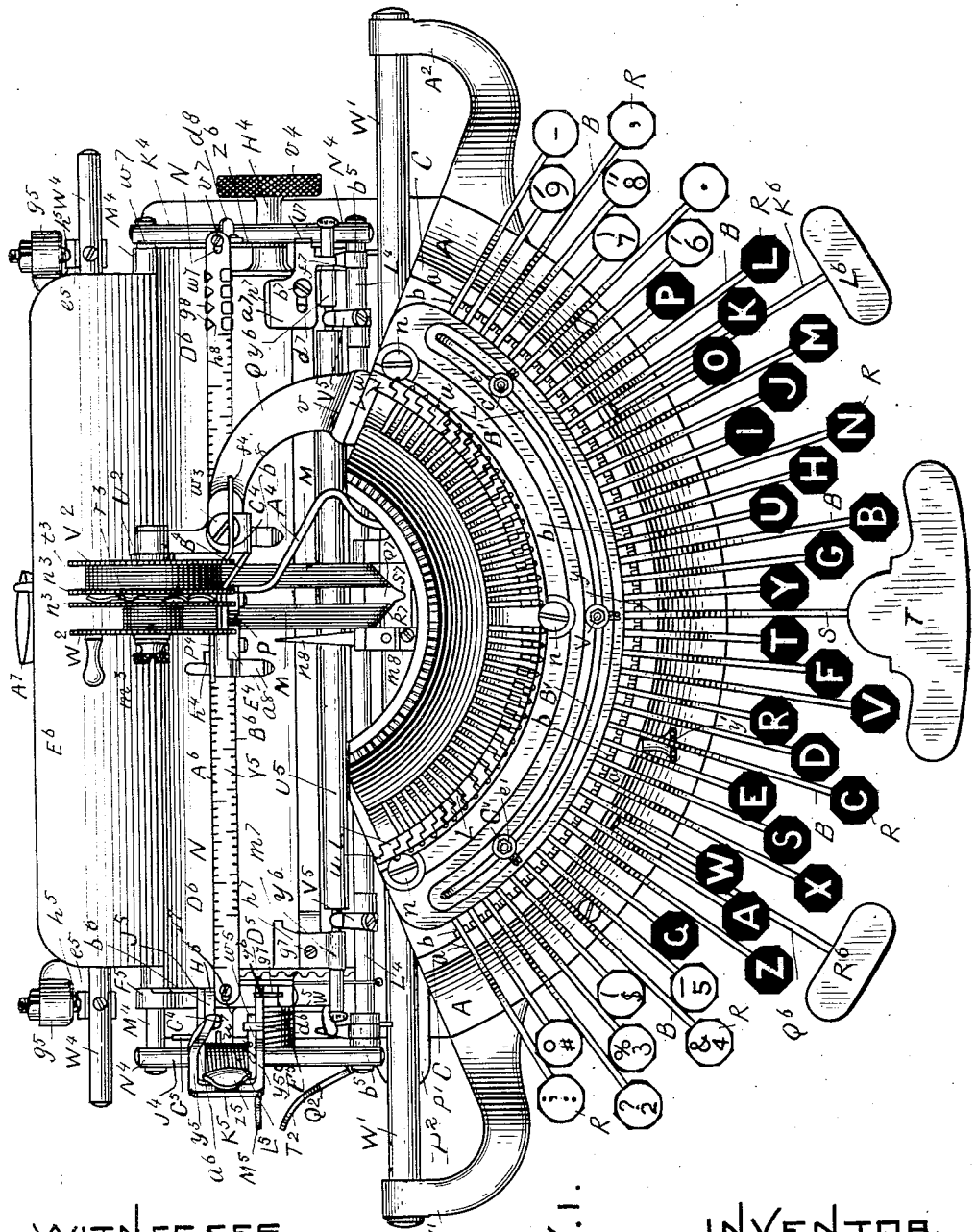
Figure 37:
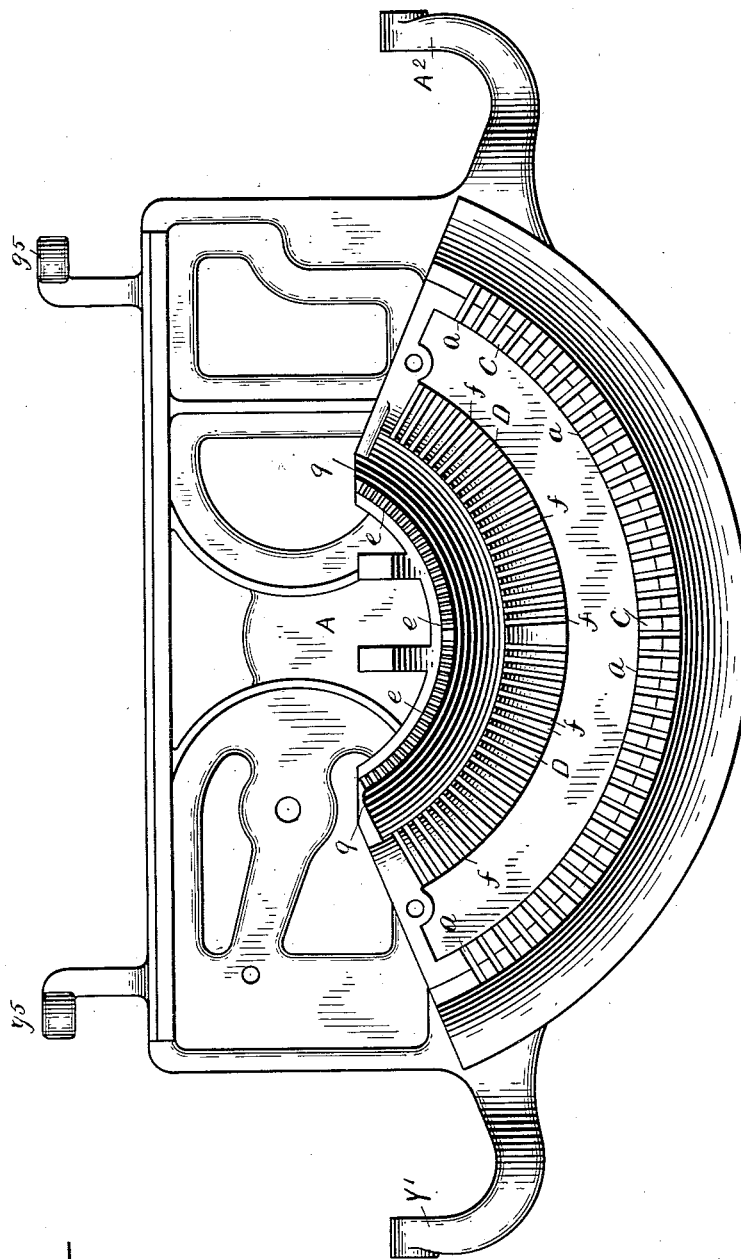
Figures 40, 44, 45:
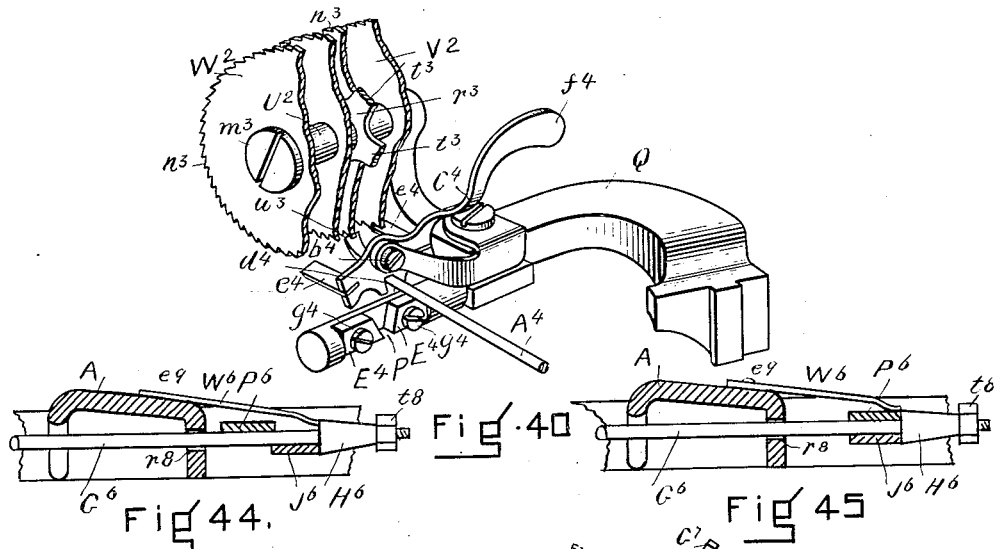
Figures 41, 42:
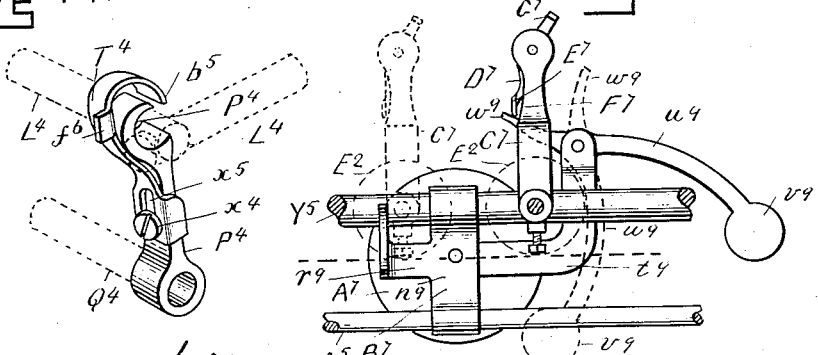
Figure 43:
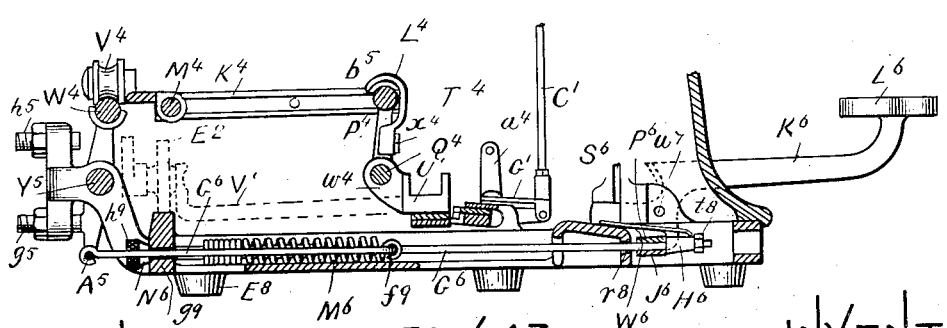

Figure 1 is a plan view. Fig. 2 is a plan view of the parts below the keys and paper-roll frame. Fig. 3 is a central vertical transverse section of Fig. 1. Fig. 4 is a detail view. Fig. 5 is a detail transverse section showing the operation of some of the parts. Fig. 6 is a detail plan and section. Fig. 7 is a detail plan of the under side of some of the parts in Fig. 6. Fig. 8 is a detail back view of the parts connected to the ink-ribbon and its spools. Fig. 9 is a side view of a spring of the ink-ribbon spools. Fig. 10 is a rear view of some of the parts shown in Fig. 8. Fig. 11 is a detail back view showing the bell and other parts in connection therewith. Fig. 12 is a detail plan view of some of the parts shown in Fig. 11. Figs. 13, 14, and 15 are detail views of some of the parts to be hereinafter referred to. Fig. 16 is a central longitudinal vertical section of the roll or platen with parts at end in front view at such section-line. Fig. 17 is a perspective view of a part to be hereinafter referred to. Fig. 18 is a detail end view of the paper-roll and some of its parts connected therewith. Fig. 19 is a detail plan view of some of the parts in connection with the paper-roll frame. Fig. 20 is a detail front view of some of the parts shown in Fig. 19. Figs. 21 and 22 are plan and end views, respectively, of one of the parts. Fig. 23 is a perspective view of one of the parts. Fig. 24 is a detail section and back view. Fig. 25 is a detail side view. Fig. 26 is a detail cross-section and side view. Figs. 27 and 28 are detail side views at right angles to each other of one of the parts shown in Fig. 5. Fig. 29 is a side view of a portion of a key. Fig. 30 is a detail section on line 30 30, Fig. 11. Fig. 31 is a detail section on line 31 31, Fig. 11. Fig. 32 is a detail front view of a rock-shaft and parts connected with the shifting mechanism. Fig. 33 is a detail section and rear view. Fig. 34 is a detail vertical cross-section. Fig. 35 is a plan view of the ribbon-shifting lever. Fig. 36 is a detail cross-section and side view to be hereinafter referred to. Fig. 37 is a plan view of the frame with the type-levers and parts detached. Fig. 38 is a detail plan view of the platen-roll with the parts for operating it. Fig. 39 is a central vertical cross-section of the frame. Fig. 40 is a detail perspective of the parts for operating the ribbon-rolls. Fig. 41 is a detail front elevation of the bell-striking device and method of operation. Fig. 42 is a perspective of the parts shown in Fig. 25. Fig. 43 is a detail cross-section showing the means for operating the carriage-frame. Figs. 44 and 45 are detail sectional and side views of some of the operating parts to be hereinafter referred to. Fig. 46 is a detail view of the under side of the paper roll or platen and its frame at one end.

In the drawings, A represents the framework supporting the various operating parts in the machine.

B B are the printing or finger keys, arranged in curved lines at the front of the machine and extending radially backward, each key being freely disposed in a radial groove $a$ in a curved raised portion C of the frame and having pivots $b$, which lie in a corner or seat $d$ of the bar C, (see Fig. 3,) the inner end of the key extending through and lying in and resting on the bottom of a vertical open radial groove $f$ in an inner curved bar D of the frame concentric to the curved bar C, the key end forming a segment of a gear E, which meshes with another segment of a gear F of the lower end of a type-bar G, having pivots $g$, which lie in an open horizontal groove $h$ in the curved bar D, forming a bearing for said pivots and yet leaving the same free to be removed, as desired.

H is a vertical wire, its lower end being enlarged to make a shoulder $i$, and having a groove $j$ on its outer end, the inner or bearing face $k$ of which is convex, which convexity rests in a concave depression $m$ in the upper edge of the key, back of its pivot, which serves to retain the wire or rod in its bearing or seat, the upper end of the rod extending freely up through a horizontally backwardly-curved plate J, rigidly secured by screws $n$ to the upper end of three upright arms K of the frame A, one in the middle and one at each end. On this rod H is a spiral spring $r$, bearing on the shoulder $i$ and against the under side of the permanent curved arm J, which acts by its tension to hold the wire to its seat and, pressing upon the rear arm of the key, hold it in its natural and normal position.

The upper end of the pivoted bar G has on its inner side, near its end, a short block L, having on its face two types $t$, one at each end, the arm projecting a short distance beyond the block, as at $u$. Each type-block on a type-arm has two different types or letters—for instance, on one end a small letter and on its other end its capital or another letter or character.

Each key has a separate type-bar, and in their upright position they rest and bear against the inner side of the curved arm J, such side being covered with leather or similar material $w$ to make a noiseless and soft seat.

The spiral spring $r$ to the rod H of each finger-key not only acts to return the type-bar and finger-key to their proper places after the key has been struck, but also serves to hold them to their seats or rest.

As the type-bars are arranged in a curved line and extend radially to a common center, which is the slot P, and as this slot is transverse or at right angles to the paper-roll or its longitudinal movements, the type-blocks L are secured rigidly to their respective type-bars, on angular portions thereof, which angles gradually vary from the two central bars, which are substantially straight, each way to the outer one of the curve, so that when each of the type-bars is swung down the type on its type-block will be presented to the platen or roll for the letter or figure to be printed on the paper on the platen in a straight line, the angular part of the type-bar on which the block is secured being made by bending the type-bar laterally correspondingly, as shown in Fig. 3 more particularly.

On the outer or operating end of each finger-key is secured a button R, on the upper surface of which is printed or marked in any suitable manner the letter or character which is to be printed by the type connected to such key.

Pressing down a key by its gear connection with a type-bar G the bar is swung down on its pivot until its type strikes upon the ink-ribbon M just above the paper roll or platen, N, its middle portion entering a slot $e$ in the part $q$ of the frame, and the projecting end $u$ of the type-bar entering the slot P.

Although the finger-keys extend in radial lines and the buttons R in curved lines in front of the machine, the letters on the buttons are all printed in parallel lines, so as to read in a direct line by the operator or at right angles to the lines of print, making practically a straight keyboard.

S is a lever or space-key projecting forward from the central line of the machine, having a broad thumb-piece T in front of the keys for ready operation, the lever extending back through an open vertical groove $y$ in the curved arm C, having pivots U resting in the bearing $d$ in said arm, its inner end located under a shoulder or right-angular bent portion $a'$ of a vertical wire V, which passes up between two antifriction-rollers $b'$, secured to the under side of the upper curved arm-support J, and freely through a hole $d'$ in said support, its upper end being secured to a curved bar or universal rod B' above the arm-support by a screw-nut $e'$ and set-screw in the support. Near each end of this curved bar B' is a rod C', secured thereto by screw-nuts $e'$ and set-screws like the wire V, which rods depend therefrom and pass down freely through openings in the curved arm-support J, and below that each is connected to a link D', pivoted to the end of a horizontal arm E' at the end of the rock-shaft F' below the body of the frame, adapted to rock on center pins or screws $f'$, one at each end in lugs $g'$ of the bottom of the frame.

The central wire V, with which the space-key S engages, continues down below the body of the frame and, being bent angularly backward, is connected to the central forward-extending-arm G' of the rock-shaft F'. Pressing down this space-key S by the three connections of the universal bar B' with the rock-shaft F', the rock-shaft is caused to rock or swing on its center correspondingly. At the central portion of this rock-shaft in a backward extension H' is a horizontal opening $h'$, in which is a horizontal plate J', secured by screws $m'$ $n'$, having two ratchet-teeth K' on its rear edge and which are back of the axial line of the shaft, and in the same opening $h'$ below the ratchet-tooth plate J' is another plate L', having two ratchet-teeth M' on its rear edge, pivoted at one, $n'$, of the securing-screws by a longitudinal slot N', which is of a length equal to the distance between its two ratchet-teeth.

An arm $r'$, secured to the front of the plate L' near its bearing-slot, projects forward, and to its end $t'$ is connected one end of a spiral spring P', which extends diagonally backward and is connected by its other end to a cross-pin $u'$ of the rock-shaft, making the plate L' a spring tooth-pawl. This spring tooth-pawl L' bears by its straight back edge $v'$ beyond its teeth against the other screw $m'$ of the permanent tooth-plate J', being held thereto by its spring P', which edge $v'$ serves as a rest to limit the backward movement of the pawl and a bearing or guide with its bearing-slot N' to its longitudinal movement, its longitudinal movement being limited to the length of its slot N'. The attachment of the spring P' to the tooth-pawl L' is at a point in front of its bearing-slot N', and as it then extends diagonally backward and is properly secured it acts not only to keep the tooth-pawl to its guiding-bearing $v'$, but to have it to the right at the proper time in its operating movement, while the arm $r'$ of the pawl being preferably made of wire it can be bent a little one way or the other to increase or decrease the tension of the spring and thus easily and conveniently regulate its tension.

A spiral spring Q' by one end is connected to an upright arm $w'$ of the rock-shaft F' and by its other end to the end of a screw-rod R', extending freely through the front of the framework, having a milled head $y'$ on its outer end by which to turn it to regulate the tension of the spring, the spring acting to return the rock-shaft to its normal position after being operated upon by the space-key.

With the finger-key or space-key up in its normal position, the rock-shaft F' is turned for its pivoted tooth spring-pawl L' to engage by its teeth M' with the teeth on the front edge of a long horizontal bar S' of the paper roll or platen carriage-frame T', and as the carriage-frame is controlled by a spring which pulls it to the left, which will be hereinafter described, it presses through the toothed bar S' the tooth spring-pawl L' longitudinally back against its spring P' the length of its slot N', which there holds the carriage-frame, and in such position the two teeth M' of the spring tooth-pawl are in line or coincident with or just under the two teeth K' of the permanent tooth-plate J'. As the space-key is pressed down it causes the rock-shaft to swing, so that the two toothed plates J' and L' are moved down sufficient to disengage the spring pawl-teeth M' from and engage the permanent plate-teeth K', respectively, with the ratchet-tooth bar S, and so long as the space-key is held down the carrying-frame will be held in its position by this engagement of the permanent plate-teeth. Immediately the spring tooth-pawl is disengaged from the tooth-bar S' the pawl is pulled to the right the length of its bearing-slot N' by its spring P', so that its teeth $m'$ will not then be coincident with the permanent plate-teeth K', but will be one tooth ahead or to the right.

As the space-key is allowed to rise the rock-shaft spring Q' acts to swing it so that the two toothed plates are swung up, so that the teeth of the permanent plate are disengaged from and the teeth of the spring-pawl plate engaged with the teeth of the ratchet-bar, which leaves the ratchet-bar with the carriage-frame free to move to the left by the tension of its spring; but this engagement of the teeth of the spring-pawl with the teeth of the ratchet-bar is one tooth farther ahead or to the right than when it was engaged with the ratchet-bar before the space-key was operated, and as the carriage-frame moves it carries with it the spring-pawl the length of its slot N', which then stops and holds the carriage-frame at such place Each finger-key is arranged to operate the rock-shaft for the movement of the paper-roll carriage-frame in the same manner, which it does by pressing its vertical rod H up against the universal rod, raising it, and as it is connected to the rock-shaft the rock-shaft and its pawl and teeth are moved to operate as described for the space-key, so that after a finger-key has printed a letter or character as it is allowed to rise the paper-roll carriage-frame will be moved, as described, to bring the paper-sheet on the roll or platen in proper position for the next letter or character to be printed.

The pawl-teeth and permanent teeth on the rock-shaft projecting horizontally beyond the central axial line of the shaft in the swinging of the shaft move practically vertically, and they are so near together that in the movement of the same up and down the teeth of one or the other will disengage or engage with the ratchet-teeth of the bar just before the other is engaged with or disengaged therefrom, insuring control of the carriage-frame at all times.

The carriage-frame consists substantially of a long flat bar U', having a central horizontal right-angled bar V' extending back therefrom, the bar being located below the front guide-rod W', which rod W' extends from an arm Y' of the frame to another arm A² at the opposite side and rigidly secured thereto. The bar U' near each end has upright arms $b^2$ extending up from each side which straddle the guide-rod W', between and to which arms, above the rod W', is pivoted a grooved roll B², which rolls rest and are adapted to run upon the guide-rod W', supporting the frame.

Secured on the top of the carriage-bar U' between each two upright arms is a flat spring C², its free end being forked and bent to form a seat or bearing $d^2$ for the journals $e^2$ of a small grooved roll D², which bears and runs against the under side of the guide-rod W', by which the carriage-frame is held to its bearing and seat upon the guide-rod W' and yet can freely move along the same.

The angular arm V', which extends back, is bent upward and has pivoted at $f^2$ a wheel E², which is arranged to roll or run upon a horizontal flat edge or strip F² of the frame of a length for the whole movement of the carriage-frame.

The carriage-frame can be moved back and forth on its resting rolls and wheels B² and F², running along on the guide-rod W' and edge F².

At the right end of the carriage-frame bar U' on its side at $g^2$ is connected one end of a chain or cord G², which extends along under the bar U' and is connected by its other end to a grooved horizontal wheel H², making the upper flange of a spool J², turning on a pivot $h^2$ of the bottom of the frame, having a flat spring K² wound thereon, secured by one end to the spool and by its other end to its journal or pivot $h^2$, which acts to pull the carriage along, as it is allowed to move by the operation of the finger or space key in a step-by-step movement. The lower flange of the spring-spool J² has gear-teeth L² on its edge, which engage with a gear M², turning on a screw-pivot $m^2$, having a handle $n^2$ on its upper side for operation thereof, this gear being held from movement by a spring N², secured at $r^2$ to the frame and engaging with the teeth of the gear M² by its bent-down end $t^2$ to hold the gear M² and thus its spring K² from unwinding, an arm $u^2$, bearing on the edge of the frame, limiting the downward movement of the spring N² and preventing its bearing against the side of the gear. If the spring K² is too strong or too weak, by turning the gear M² in the proper direction by its connection with the gear L² of the spool J² the tension of the spring is decreased or increased, as desired, the holding-spring N² being disengaged to allow of such movement.

Secured to the under side of the carriage-frame bar U' is the ratchet-teeth bar S', which consists of a flat strip having ratchet-teeth on its front edge, and below this is a flat strip P², extending its length and secured thereto by the screws $v^2$, which secures the ratchet-tooth bar also to the frame-bar, but which pass through angular slots $w^2$ in the strip $p^2$, and so the strip P² can freely move thereon, as desired. This strip P² is in the same horizontal plane as a shoulder $a^3$ on the under side of the spring tooth-pawl L' of the rock-shaft, and in its normal position its front edge $b^3$ is just back of the vertical plane of the teeth of this pawl.

Pivoted to the end of the bar U' of the carriage-frame at $d^3$ is a horizontal lever Q², having an arm extending back and a downwardly-extending pin $e^3$ therefrom, which passes freely through a slot $f^3$ in the bar U' and engages with a cross-slot $g^3$ in the end of the strip P². This lever Q² is pivoted to the pin on which it turns by two arms $h^3$, bent over from its edges, and in between these arms, encircling its pivot $d^3$, is a spiral spring R², one end of which bears against the lever and its other end against an arm S² of the frame-bar U', by which the lever is held in the position as shown in Fig. 2, and thus the strip back from and free of the toothed pawl.

When desirous of letting the carriage-frame move any length by one movement beyond the limit of one tooth of its ratchet-bar, by pressing the end T² of the lever Q² to the right the strip P² will be moved longitudinally to the left, and in such movement being guided by its angular slots $w^2$ it will be moved forward sufficiently to press against the shoulder $a^3$ of the spring-pawl L', and move it forward and free it from the movement of its teeth M' with the teeth of the carriage-frame ratchet-bar S', when the carriage-frame will be free to be moved back and forth as desired, and releasing the lever the strip is moved back by its lever-spring R² out of the way of the shoulder $a^3$ of the spring tooth-pawl L', leaving the pawl free to engage with the carriage-frame ratchet-bar again and hold it in place.

Pivoted on a horizontal shaft U² of the frame-arm Q and secured by a screw $m^3$ are two spools V² W², which carry the ink-ribbon M, each free to turn on the shaft independently of the other, and the edges of each flange of the spools having ratchet-teeth $n^3$, and between the two spools is a plate $r^3$, encircling the roll-shaft U² and having radial spring-arms $t^3$, as shown in Fig. 9, which plate, by its central portion against the spool W² and by its radial spring-arms against the other spool V² creating tension on the two spools to hold one or the other from unwinding too fast as the ink-ribbon is being drawn from it. The ribbon is wound upon one spool and then its free end passes under its bearing-arm forward and over a flat piece Q⁷, secured to a projection of the curved frame, which flat piece has its front edge V or wedge shaped, as at R⁷, having a central forward projection S⁷, the ribbon passing down over one side of such edge and up and over the other side of such edge, (the central piece being between the two portions,) and thence back under the bearing to the other spool, to which it is secured, the ribbon as it is rolled upon one spool and unwound from the other in the operation of the machine freely passing round this V-shaped guide and presenting a flat surface always to be printed upon.

A⁴ is a wire having a flat sharpened edge $u^3$ to engage with the ratchet-teeth $n^3$ of the spool-flange and held to its engagement therewith by a flat spring $v^3$, secured to the arm Q by a screw $w^3$, and bent down into proper shape to bear by its free end against the under side of the wire pawl A⁴. This wire extends back and under the upper portion of the frame and is bent down, and by its other end $y^3$ is pivoted to an upright arm $a^4$ of the rock-shaft, so that as the rock-shaft is moved in the operation of a finger-key the wire pawl A⁴ will be moved back sufficiently to turn the ribbon-spool with which it engages a certain distance, and as the rock-shaft returns to its normal position the wire pawl is moved forward to be in position to engage again with the ribbon-spool for operation on it as before.

On an arm B⁴ of the ribbon-spool arm Q in the front of and just below the ribbon-spool is pivoted at $b^4$ a lever C⁴ to swing vertically thereon, having an open slot $d^4$ in its lower edge, through which extends the pawl-wire A⁴, operating the ribbon-spool; and projecting backward from each end of this lever is a flat spring $e^4$ in the same vertical plane as the outside flanges, respectively, of each spool and projecting slightly thereunder. Swinging this lever $C^4$ by its handle $f^4$ up and down on its pivot it moves the pawl-wire $A^4$ from its engagement with the flange of one ribbon-spool to its engagement with the flange of the other ribbon-spool, and vice versa, and also moves one of its springs $e^4$ into position to bear and engage with the outer flange of the ribbon-spool with which the operating-pawl $A^4$ is engaged to prevent backward movement of the ribbon-spool being operated by the wire pawl $A^4$.

On the front of an arm $D^4$ are two blocks $E^4$, secured each by screws $g^4$ thereto, which blocks have their adjacent edges separate from each other, leaving the alinement-space P between them, it being wider at its upper end, as shown in Figs. 10 and 40, its lower end being just wide enough to freely receive the end $u$ of the type-bar, the upwardly-flaring sides insuring the type-bar entering the slot for each type to print in the same place.

On the back of the arm $D^4$, secured by screws $h^4$, is a strip $P^4$, one at each end, which pass through longitudinal slots $m^4$ and screw into the arm $D^4$, but which allows free movement of the strip back and forth the length of its slots. Its upper edge has two earpieces $n^4$, which extend upward and are bent over its supporting-arm $D^4$, between which earpieces is disposed the downward projection $r^4$ of the lever $C^4$, in which is the open slot $d^4$ for the operation of the wire pawl $A^4$. On the under side of this strip $P^4$ is a small flat piece $t^4$, projecting backward therefrom and then sidewise or parallel with the strip, being bent upward a little, between which and the strip runs the ink-ribbon M, which passes under the alinement-slot P, so that as the ink-ribbon is used on one edge by moving the lever to change the winding of the ribbon the ribbon will be moved sidewise out of direct line with its movement to present the other edge or a fresh surface of the ribbon for printing.

On the under side of the arm $D^4$, to which the ribbon-shifting lever is attached at the left, is secured a transverse plate $a^8$ at or about its central portion, its two ends respectively projecting forward and backward of the arm and being slightly curved upward, and at the right is secured a spring-plate $b^8$ to the arm Q, projecting forward. On the under side of this same arm $D^4$ is also secured a flat spring $e^8$, extending with the arm and having its free end $f^8$ bent upward substantially at right angles, which bent end extends up a short distance into the alinement-slot P, as shown in Fig. 10 more particularly.

N is the paper roll or platen, and it is secured to a longitudinal central shaft $H^4$, which extends through it and is adapted to turn by its ends in bearings in two cross-rods $J^4$ $K^4$, secured at their ends to two longitudinal rods $L^4$ $M^4$, making a frame $N^4$, in which the paper-roll is disposed, its shaft $H^4$ extending beyond the cross-bar $K^4$ at the right and having a milled head $v^4$ secured thereto for turning it by hand. This paper-platen frame $N^4$ is supported on the carriage-frame T by its front rod $L^4$ in two hooks $P^4$, open at their rear side, extending down and secured to a rod $Q^4$, adapted to turn or rock in bearings in arms $w^4$ of the carriage-frame bar $U^4$, one at each end, and each hook having a flat piece $T^4$ secured to its front side by a screw $x^4$, passing through a slot $x^5$ in the piece and screwing into the arm of its respective hook so it can slide up and down freely, its upper end $b^5$ being bent over and downward a short distance to extend over and in front of the opening of the hook $P^4$ when down at its lowest point, in which the frame-rod $L^4$ is disposed so that when the frame-rod $L^4$ is in place the portion $b^5$ of the piece will be over the open end of the hook as a guard or latch and prevent the rod $L^4$ from escaping, as shown in Fig. 25, but simply moving up this guard or latch, taking hold of its earpiece $f^6$ for the purpose, the opening of the hook will be uncovered, as shown in Fig. 42, sufficiently for the rod to be moved out and disconnected therefrom for the purpose of removing the platen-frame from the machine. The platen-frame is also supported by its rear rod $M^4$ as follows: Secured by pins $a^5$ to the rear rod $M^4$ of the roll-frame are two flat bars $U^4$, each having pivoted at $d^5$ at its end a grooved roller $V^4$, which rollers, when the roll-frame is in place in the machine, its front rod $L^4$ in the swinging hooks, rest and bear upon a rod $W^4$, secured to the upper end of two upright bars $X^4$, one at each end, which bars are secured at their centers to a rod $Y^4$, adapted to turn in bearings at each end in arms $e^5$ of the frame to swing vertically thereon, the lower end of these bars $X^4$ being firmly connected by a horizontal rod $A^5$. (See Figs. 3, 18, and 19.) These uprights $X^4$ and connecting-rods $W^4$ and $A^5$ constitute the shifting frame $B^5$ for the platen, and it is arranged to swing on its pivoted rod $Y^4$ a certain distance forward and backward, the upper rod $W^4$ being limited in its forward movement by the lower end of each of its upright bars abutting against a screw $f^5$, screwing through the lower end of vertical-arm extension $g^5$ of the frame-arm $e^5$ and in its backward movement by the upright bars abutting by their upper ends against screws $h^5$, screwing through the upper end of the vertical arms $g^5$, the screws in each case being secured by set-nuts.

On the top of the bar $U^4$, secured to the rod $M^4$, carrying the two upright grooved wheels $V^4$, is a plate $C^5$, secured by a screw $m^5$ thereto so it can swing thereon, and having a finger-piece $n^5$ for operating the same, and having a downward hook-piece $q^5$, which when the platen-frame is in place on the carriage-frame is swung forward for its hook $q^5$ to pass under the rod $W^4$, by which the platen-frame is prevented from accidentally rising, but which can be raised, when desired, by simply swinging this hook $q^5$ outward from its engagement with the rod $W^4$.

Centrally connected to the under rod $A^5$ of the shifting-frame B⁵ is a wire G⁶, which extends forward and passes freely through a hole in a portion r⁸ of the frame nearly to the front and has a cone-shaped block H⁶, screwed onto its end and secured by a set-nut t⁸, and against the larger or inner end of said block H⁶ on the under side of the wire G⁶ bears the end of a lever J⁶, pivoted at u⁸ to the lower part of the frame, the other arm of said lever having bearing against it a downwardly-projecting arm v⁸ of a lever K⁶, which is the shift-key pivoted at u⁷ to swing vertically thereon and extending out through an opening x⁷ in the front of the frame and having a flat thumb or finger piece L⁶ for operation of the same.

On the upper side of the wire G⁶ at its shoulder end is the end w⁸ of a horizontal lever P⁶, pivoted to the bottom of the frame, and bearing by its other arm against the end of an arm of a lever or another shift-key Q⁶, pivoted to the front of the frame and extending through to the front beyond the keys and having a thumb-piece R⁶ for operation thereof.

The inner end of each lever K⁶ and Q⁶ has a vertical rod S⁶, secured to it, having a spiral spring T⁶ thereon which bears against the under side of the upper plate U⁶ of the frame and acts to return the levers to their normal positions.

Secured at e⁹ to the bottom frame-plate V⁶ is a flat spring W⁶, its free end extending forward and resting on the cone-block H⁶ of the rod, and its purpose is that when the shift-key K⁶ is operated, pushing the wire G⁶ and the cone forward against its spring, the free end of the spring W⁶ will drop down back of the larger end of the cone-block H⁶ (see Fig. 44) and hold the wire from returning to its normal position, and thus the shift-frame B⁵ in its back position, but operating the shift-key Q⁶ the end of the lever P⁶ will pass under the spring W⁶ and raise it high enough to release it from the shoulder or end of the cone-block H⁶, (see Fig. 45,) when the wire G⁶ and the shift-frame B⁵ are free to return to their normal positions. The object of these two levers K⁶ and Q⁶ is to swing the shift-frame B⁵ and thus the paper-platen frame back, as described, when desirous of printing capitals or the other letter or character on the key.

The wire G⁶ is bent horizontally at right angles at f⁹, to which part is secured a spiral spring M⁶, its other end being secured to a screw N⁶, passing through the rim g⁹ of the frame and having a screw-nut h⁹ on its outer end by which to regulate the tension of the spring, the screw-nut bearing against the rim. Between the lower rods A⁵ of frame B⁵ on the wire G⁶ and the upturned edge g⁹ of the rear frame is a spiral spring m⁹, which also acts to force back to its normal position the platen-carriage frame.

With the paper-platen in its normal position the small letters on the type-block will be printed; but by pressing down the shift-key G⁶, which then moves the paper-platen, as described, in striking the same key its capital or another mark or character will be printed, and if desirous of printing capitals one after another and not wishing to hold the shift-key so long press down the shift-key K⁶, which moves the paper-roll back and holds it by the spring W⁶, bearing against the adjustable cone-block H⁶ on the connecting-wire G⁶, when the capitals can be printed continuously, and to release the paper-platen to return it to its normal position press down the shift-key Q⁶, which will release the spring, as before described, allowing the paper-platen frame to return to its normal position, so that the small letters would be then printed.

On the left-hand end of the paper-platen is a gear D⁵, with which engages the end of a pin E⁵, adapted to slide back and forth horizontally in a bearing in a support F⁵, secured to the rod M⁴ and platen-frame central rod H⁴ and having a spring t⁵ in said bearing, which is arranged to bear against the pin and hold it to its engagement with said platen-gear D⁵, to keep the platen from turning accidentally, but not so but that it can be turned by hand or by other mechanism applied thereto. Pivoted at u⁵ to this support F⁵ is a lever G⁵, one end of which engages with said pin E⁵, so that by pressing the handle end v⁵ of this lever to the right the pin E⁵ will be moved backward against its spring and disconnected from the platen-gear D⁵, so the platen will be free to be turned as desired.

The gear-teeth are preferably made a little rounding and the engaging end of the pin correspondingly so, to enable the platen to be turned easily by hand or by operating parts when desired, but yet not so much but that it will be held from accidental movement otherwise.

H⁵ is a pawl arranged to engage by its end with the platen-gear D⁵ above the pin E⁵ and pivoted at r⁵ to the end of an arm J⁵, arranged to rock on the cross-rod J⁴ of platen-frame, the rod being bent forward, as at J⁹, and extending a short distance along the side of the cross-rod J⁴, and then bent toward and encircling the cross-rod, as at W⁵, making another bearing for the arm J⁵ and projecting a short distance beyond the rod. Adapted to rock on the cross-rod J⁴ by two arms y⁵, which are outside of the arms of the pawl-support J⁵, is a lever K⁵, one end z⁵ of which extends upward for a handle, and one, a⁶, of its arms extending over and arranged to bear on an arm b⁶ of the pawl H⁵, so that swinging this lever by its handle to the right its arm will press upon the pawl-arm b⁶, and, moving it down, cause the pawl to engage with the tooth of the platen-gear, the arm J⁵, to which the pawl is pivoted, swinging down sufficiently to allow of such movement, and as the lever is pressed its full movement forward the platen will be turned a certain distance, limited by the abutting of the pawl-supporting arm J⁵ upon the support F⁵ of the spring-pin E⁵. The arm b⁶ of the pawl is freely disposed in a hook G¹ on the end $a^6$ of the lever K⁵, which, when the lever moves back to its normal position, swings the pawl back free and clear of the platen-gear, so the platen can be turned freely otherwise.

Between the two arms, turning on the cross-rod J⁴ of the pawl support J⁵, is a spiral spring L⁵, surrounding the cross-rod, which spring is secured by one end to the cross-rod and by its other end to and under the pawl-suppporting arm, which spring acts to return said supporting-arm J⁵ and raise the pawl H⁵ after it has been moved down by the lever into position to again operate upon the platen, and which upward movement is limited by the arm W⁵ of the pawl-support abutting against the under side of an angular arm $d^6$ of a lever M⁵, pivoted at $e^6$ to an arm of the spring-pin support F⁵ to swing vertically thereon. Pressing this lever M⁵ down by its handle end swings its arm $d^6$ forward over the arm $w^5$ of the pawl-support nearer to its pivoted bearing, so that the movement of the pawl-support is limited, which is a movement only necessary to turn the platen the distance of one gear-tooth, or the smallest space between printed lines on the paper, and pressing up such lever the angular arm is swung back farther from the pawl-supporting arm-pivot, which allows the pawl-support to move farther, by which the platen will be turned the amount of two gear-teeth, making the space on the paper between the printed lines correspondingly wider.

The movement of the lever M⁵ is controlled by a stiff flat spring $g^6$, secured to the support F⁵ at $h^6$, having its free end bent to form notches or seats $m^6$ and bearing against an arm $k^6$ of the lever, but so it can be swung from one notch to the other and be held firmly in position by either.

Pressing against the under side of the platen is a rubber feed-roll N⁵, which is secured to a longitudinal central shaft P⁵, adapted to turn at each end in a seat or socket $n^6$ in a separate spring-arm Q⁵, which spring-arms at their other ends are secured by screws $r^6$ to an arm R⁵, one end of the arm surrounding the roll-frame rod M⁴ and firmly secured by a set-screw $y^7$, so that the rubber feed-roll is held by the pressure of the two spring-arms firmly against the platen, which pressure can be regulated by turning in or out the screws $r^6$, each spring being arranged to bear by its end against the end of its arm R⁵, to which it is secured in such manner that the spring is at an angle therewith, as shown in Fig. 18, so that in turning the screw $r^6$ in it will force the spring up to exert more pressure on its feed-roll against the platen and turning it out exert less pressure.

E⁶ is a paper plate or table curved backward and extending down between the rear rod M⁴ of the platen-frame to the under feed-roll and secured rigidly in position by lugs $x^7$ on its inner side to the rod M⁴ by set-screws $z^7$.

Connected to the forward rod L⁴ of the frame N⁴ is a thin guard or guide plate S⁵, extending the length of and down and under the same nearly to the feed-roll N⁵, arranged substantially concentric to the platen, but a short distance from it. (See Fig. 18.) This plate S⁵ is connected to rod L⁴ by flat pieces T⁵, one at or near each end, which extend partially around the rod, and are then bent and secured to the plate, as at $t^6$, by which the plate can rock or partially turn on the rod L⁴ as a pivot or hinge.

U⁵ is a rubber feed-roll above the platen, having a central longitudinal rod or shaft $u^6$, which is arranged to turn in under open bearings $w^6$ in the free ends of flat springs V⁵, one at each end, secured by screws $v^5$ to flat places $x^6$, cut in the rod L⁴ at angles to the line of the springs, by which the feed-roll is held by the pressure of its springs to bear upon the paper-platen, such pressure being adjusted by its screws $v^5$. The curved guide or guide-plate extends at its upper edge close up to this feed-roll U⁵ and at each end has an arm $y^6$, which is bent partially over the feed-roll shaft, the one at the right extending beyond the shaft in substantially a horizontal plane over the platen and forms a bearing or seat, on which is secured a thin plate $a^7$ by a screw $b^7$, passing through a slot $d^7$ in the plate longitudinally parallel with the axis of the feed-roll and screwing through the piece into the arm $y^6$, securing all together, but so the upper plate can move back and forth the length of its slot. This plate $a^7$ has at one end an upward projection U⁷ to form a small handle, and at the side a portion $f^7$, which extends down and is bent up partially around the feed-roll shaft, which prevents swinging of the plate and guides it in its movement on its seat.

The arm $y^6$ at the left has secured to it firmly by a screw $g^7$ a small plate $h^7$, which has a tongue-piece $m^7$ projecting to the right which is of a width to correspond to the height of the body part of the small letters of the type-block, and it is so located in relation to the line of print of the type that its back edge will be in line with the top of the letters and its front edge with the bottom of the letter.

The slotted plate $a^7$ at the right has its rear edge $n^7$ to correspond or be in line with the rear edge of the plate $h^7$ at the left, and this edge is turned up along its length as the rear edges of these two plates $a^7$ and $h^7$, serving as gages for lining up the paper sheet. (Shown in Fig. 22.)

Swinging on the platen-shaft H⁴ is a lever W⁵, having a handle $h^7$, (see Fig. 4,) which projects forward and extends up under the end of the roll-shaft $w^6$, having a hook end $r^i$ to prevent any too far forward movement and having a notch or seat at $t^7$ of a size to fit the roll-shaft $w^6$, but at a radial distance farther from its pivoted bearing than the hook-end $r^7$, so that swinging the lever back its edge will press forward the shaft $w^6$ and raise the feed-roll against its spring $V^5$ from bearing upon the platen, and so hold it by its shaft resting in its seat $t^7$, so that the paper can be moved freely to adjust and true it in the machine.

$Y^5$ is a flat strip which extends just above and along the platen, having two numeral-scales $A^6 B^6$, one on each edge, and this strip is secured to two arms $Z^6$ by longitudinal slots $u^7$ and screws $v^7$, one arm at each end of the platen, which arms extend down by the end of the platen and pivoted on the platen-shaft, so the strip can be swung forward and backward within certain limits.

$D^6$ is an upwardly-curved plate extending along and parallel with the platen back of the scale-strip $Y^5$, connected at each end by arms to the rear rod $M^4$ of the platen-frame, the front edge of this plate laying close to the platen, serving as a guide to the paper sheet as it is fed through the machine to prevent its forward end passing down behind the platen.

$C^6$ is a spiral spring secured by one end to the right arm $Z^6$ of the scale-strip and by its other end to the arm of the plate $D^6$ next thereto, the tension of which holds the scale-strip back, where it rests by its arms $Z^6$, against the ends of the arms to the curved plate $D^6$.

When the scale-strip is swung forward, it strikes and bears against the under side of the spring-plate $b^8$, secured to the arm-support $D^4$ for spool, and holding the strip in such position until pushed back, the strip having a finger-piece $d^8$ at one end for moving it.

On the scale-strip are several clasps $g^8$, which are formed of a small narrow strip bent upward and over the edges of the strip $g^8$ and extending a short distance on its upper side, their ends being sharp or V-shaped, as at $h^8$, to point at any desired mark on the scale.

On a short arm $m^8$ of the frame is an index finger or point $n^8$, secured to the arm by a screw projecting horizontally backward, and when set its point will be just over the rear scale on the scale-strip when it is swung forward on its pivoted bearing.

The clasp-pointers are for use when desirous of printing in certain longitudinal lines on the paper sheet, they being set or moved along the scale-strip until their points are at the desired places along the strip, according to the division required on the paper, and then the paper-platen is moved until these clasp-pointers come in line or opposite to the index-finger, when the letter or finger will be printed in the proper place.

$A^7$ is the bell, having a screw $h^9$ secured to its convex side at its center, by which it is screwed into the side of a vertical arm $B^7$, using the bell itself for the screw-head or thumb-piece. The arm $B^7$ is made in two parts, having their upper and lower ends curved toward each other, so as to clasp between them the central rod $Y^4$ and the lower rod $A^5$ of the shift-frame $B^5$. The bell-screw has a shoulder $m^9$, abutting against the first arm portion, passing through such arm and screwing into the other arm, by which the arms are firmly secured to their rods and the bell to the arms. Loosening the bell-screw the arms with the bell can be moved along their guiding and supporting rods, as desired, and there secured by tightening up the bell-screw.

The front part $n^9$ of the arm $B^7$ has a side extension $r^9$, which is bent forward and then upward into the path in which an arm $C^7$, secured by a screw $d^9$ to the end of the carriage-frame arm $V'$, travels, so that after the carriage-frame has moved beyond the point where the bell is caused to sound the arm $C^7$ of the carriage-frame arm will abut against the upward portion of the arm $r^9$ of the arm $B^7$ and stop the frame from further movement.

The rear part of the arm $B^7$ has an arm $t^9$ extending to the right, upward and then backward, and upward, to which latter upward part is pivoted an arm $u^9$, its lower end being enlarged, as at $v^9$, constituting the bell-hammer, which when the arm is swung in the right direction will in returning from its gravity strike the bell and sound it, the bell-arm having an upper extension $w^9$, by which to operate it.

The arm $C^7$ from its point of attachment to the arm $V'$ extends up and then back just under the upper rod $W^4$ of shift-frame and then upward back of the rod and has pivoted to its upper end an arm or frame $D^7$, whose lower portion inclines backward into the vertical and horizontal planes of the upper arm $w^9$ of the bell-arm, and this pawl $D^7$, having a shoulder $E^7$, which abuts against its supporting-arm $C^7$ at $F^7$ to prevent any further swing of the pawl to the right, but having free movement to the left of about a quarter-turn, being stopped by another shoulder or bent portion $G^7$, abutting against the other side of its supporting-arm. This pawl $D^7$ is to ring the bell, and as the carriage-frame moves along to the left, when the pawl reaches the extension $w^9$ of the bell-arm, in its continued movement it strikes such arm and moving it along swings up the bell-hammer, and as its arm passes under the pawl it is released therefrom when the hammer falls and strikes the bell. As the carriage-frame is moved back to the right the pawl is swung upward and passes freely over the bell-hammer arm $w^9$ without operating it and after passing the same it drops by its gravity into position to operate the bell-hammer again to strike the bell.

$H^7$ is a plate or arm having its upper end bent to form a seat or bearing $J^7$ to rest against the back of the middle rod $Y^4$ of the shift-frame $B^5$, having secured to its side a spring-piece $K^7$, which extends up in front of and is bent nearly around the rod $Y^4$, as at $y^9$, in the opposite direction to the plate, the two being secured together by a screw-bolt L⁷, and nut having a head a¹⁰, for operation of the same, by which the arm H⁷ is held to the rod and yet can swing thereon.

The lower end of the arm H⁷ is bent forward a little to bear against the lower rod A⁵, which prevents any further movement of this arm forward. (See Fig. 31.)

The arm H⁷ extends to the right and is there bent forward, as at M⁷, which forward portion extends upward and is adapted by its inner edge N⁷ when the arm is swung down to engage with notches or teeth P⁷ on and along the front side of the rod A⁵, which prevents any movement of the arm H⁷ along the rod; but when it is desired to move the arm along the rod take hold of the screw L⁷ and swing the arm up backward, which moves or swings the edge portion N⁷ down and out of its engagement with a tooth of the bar A⁵, when the arm can be moved freely along the rod. When in its desired position, swinging the arm H⁷ down again, its edge N⁷ is swung up and engages with a notch at such place and holds it from movement thereon.

The rod Y⁴ is marked with a scale on its upper edge corresponding to the notches or teeth P⁷, which scale corresponds to the scale A⁶ on the swinging scale-strip, and when desirous of having the paper-platen in moving it back to the right stop at any desired point to make any desired margin on the paper sheet to commence the printing-line at such point note the number on the scale at such desired point and then set the arm H⁷ for its edge N⁷ to be in a notch opposite to the same number on the scale on the rod A⁵, when the paper-platen will always stop at such place.

To prevent injury to the type of a type-bar if it should be moved forward to print while another type-bar is in the alinement-slot which from some cause has not returned to its proper normal position, on the top of each bar centrally over its block is an upwardly-projecting point or pin T⁷, against which the type-block of the other type-arm would strike between its two type, and thus prevent its type from striking on the top of the type-bar already in its seat, this point being a little longer than the height of the type above the block.

The plate over the paper-platen at the right when in its normal position is, as shown in Fig. 1, moved to the left the length of its slot, and this plate by its turned-up edge n⁷ serves as a guard or shield to prevent the type from printing beyond a certain point on the paper by the type-block between two types thereon striking on such edge, which is in line therewith, and not, as is often the case, several type striking the paper in the same place at the end of the line; but if desirous of printing one or more letters at the end of the line by sliding the plate to the right such letters can be printed, when the plate can be moved back and serve as a guard or shield as before.

In arranging for the type-block to strike the edge n⁷ of the plate a at its middle portion it prevents the type from striking the plate and thus injuring them.

In the use of this type-writing machine the paper sheet V⁷ is inserted back of the paper-platen in front of the paper-table E⁶ between it and the paper-platen and then the milled handle v⁴ turned to the right, which turns the platen and draws the paper sheet between it and the under feed-roll N⁵, being guided around the paper-roll by the under curved plate S until it reaches the small feed-roll U⁵ in front of the paper-platen, when it passes between it and the platen. The gage or scale-strip Y⁵ is then swung forward on its pivots, which guides or forces the end of the paper sheet under it, and when sufficiently past its rear edge the scale-strip is allowed to move back to its normal position. In turning the paper-platen, as described, if desired the spring-pin E⁵ can be released from its engagement therewith by pressing its finger-lever G⁵ to the right, enabling the paper-platen to be turned freely and easily, although from the shape of the gear-teeth and the engaging end of the spring-pin the paper-platen can be turned without much difficulty. With the paper thus in position the machine is ready to print, which is done by striking the key of the letter desired, which operates its type-bar by its segment-gear connection therewith, its type-bar moving down. its end passing into the slot P, and the type thereon striking upon the ribbon and printing the letter on the paper sheet. The position of the paper-platen carriage-frame is in such position that the ratchet-teeth of the bar S⁷ of the carriage-frame rests by one of its teeth against the teeth of the spring-pawl L', which is moved back, so that its two teeth are coincident with or just under the two teeth of the permanent plate J'. As the key-lever is moved down through its upright-rod connection with the curved bar B', which is connected to the rock-shaft F', the rock-shaft is moved so as to swing the two tooth-plates down, which carries the permanent plate down, so that its teeth engage with the carriage-frame ratchet-tooth bar, and in such position, so long as the key is held down, the carriage-frame is held from movement after the ratchet-tooth bar has made an engagement with the permanent plate-teeth. The spring-pawl being free of the bar, from the action of its spring, is immediately moved back the limit of its slot N'. Immediately the key is allowed to rise the spring Q' operates upon the rock-shaft to raise its tooth-plate, so that the permanent plate-teeth pass above and are disengaged from carriage-frame ratchet-bar, and the spring-pawl teeth move up to and come into engagement with the ratchet-bar, and as the pawl is free to be moved back the spring K², attached to the carriage-frame, pulls the carriage-frame back, carrying with it the spring tooth-pawl, but it is stopped by the abutment of the end of the slot of the spring-pawl against the cross-pin, when the paper sheet is in position to have another letter printed thereon. To make one or more spaces between the letters, press down the space-key R$^6$, which operates the rock-shaft and its spring-pawl, as before, letting the carriage move, but without printing.

The keys having figures also have other marks, such as punctuation-marks, &c., and to print one or the other the carriage-frame is operated, as described, for the small letters and capitals.

To know when the paper-platen has moved nearly its limit to the left, the arm B$^7$ on the carriage-frame rods Y$^4$ A$^5$, carrying the bell and its hammer, can be moved at any point along its supporting-rod, if it is desired, for its operation by the swinging pawl D$^7$ on the carriage-frame arm, and thus sound the bell as a warning, when the carriage-frame can be moved back to its starting-point, it being stopped when moved to the right by the carriage-frame arm abutting against the bent arm N$^7$ of the marginal stop M$^7$ of the arm H$^7$, attached to the frame-rods Y$^4$ and A$^5$. As the key is pressed down to print, the wire pawl A$^4$ is pushed ahead sufficiently to turn the ribbon-spool to cause a new or fresh portion of the ribbon to be under the alinement-slot for the printing of the next letter, and as the key rises the wire pawl is returned to its position to move the ribbon-spool, as before.

When the ribbon is wound in the operation of the machine fully upon one roll, by moving down or up, as the case may be, the lever C$^4$, which engages with the pawl-wire, the ribbon will be moved to the left or right to bring a new surface of the ribbon to the left or right, as the case may be, and the pawl A$^4$ to engage with the other ribbon-spool, and thus in the operation of the machine wind the ribbon thereon, and when fully wound thereon the pawl can be moved back to connect with the other spool, as described, so that in the use of the machine the whole surface of the ribbon can be utilized.

After printing a line and desirous of turning the paper-platen to present a new portion of the paper to the type to print the next line move the lever K$^5$ to the right, which operates its pawl and turns the paper-platen a distance equal to one or two of its gear-teeth, according to the amount of movement allowed the lever by its stop-lever J$^5$.

To move the carriage-frame to the left without operating its space-key, press the lever G$^5$, which moves the flat strip P$^2$ forward and pressing against the spring-pawl L' disengages it from the ratchet-bar S', when the carriage, with the paper-roll, will move free along, as desired, and stopped by releasing the lever.

If desirous of truing the paper on the platen, press forward the lever W$^5$ at the left, which raises and frees the feed-roll U$^5$ from its pressure upon the paper-platen, when the paper can be adjusted as desired, the feed-roll N$^5$ not interfering with such adjustment, and then releasing the lever the feed-roll will be held by its spring V$^5$ against the platen as before.

The lever operation upon the ribbon and wire pawl can be arranged in any suitable manner that will move these parts as desired.

As the type strikes the paper to print the end $u$ of the type-bar beyond the type-block strikes against the end $f^8$ of the spring $e^8$, moving it down, and which in its rebound gives an upward impetus to the type-bar to insure its return to its normal position for operation again, and also preventing it from sticking in the line-slot to prevent crocking or smutting the paper.

In Figs. 17 and 34 is shown in perspective an extra foot-piece A$^8$, which is composed of a flat bar B$^8$, having a projection or foot C$^8$ on its under side, with a socket D$^8$ therein from its upper side. This socket D$^8$ is adapted to fit over a foot E$^8$ of the frame A, the bar having a hole F$^8$ in its other end, through which a screw passes to secure the foot-piece to the under side of the frame, which is done by placing the socket D$^8$ over a foot E$^8$ at the rear of the machine and then screwing the screw F$^8$ into the frame, which firmly holds it in place, utilizing in such a screw-hole G$^8$, that is to hold the machine to the bottom of a casing or covering in transportation. There being one foot E$^8$ at each corner at the rear of the machine, preferably two of these foot-pieces A$^8$ are used, and the use of these foot-pieces is to elevate the rear of the machine when desired, which enables the operator to then more readily see what is being printed on the paper. Also by elevating the machine the return of the platen-frame to its normal position after being moved back is insured by its gravity, and it also holds it more positively in such position, thus assisting to make the frame the more steady. The marginal clasp can be set at any point on the rod, it limiting the movement of the platen-frame to the right by the central arm of the carriage-frame abutting against or striking the arm.

Whatever mark on the scale A$^6$ is opposite the pointer $n^8$ the letter, if then printed, will be opposite to a corresponding mark on the scale B$^6$, whereby the paper-roll can be set to print a letter on the paper sheet at any desired place.

An arm $c^6$ of bar J$^9$ extends under the lever K$^5$ for the lever in its return movement to press down upon it and return the bar J$^9$ to its normal position, insuring such movement in case its spring should not act.

Having thus described my invention, what I claim is—

1. In a type-writing machine, in combination, a paper-platen carriage-frame arranged to slide back and forth on a suitable guide-way, a rod secured to a support, a series of notches on one side of said rod and an arm adapted to swing on said rod and slide back and forth thereon in the pathway of said frame, the edge of said arm being arranged to engage and disengage with said notches as the arm is swung down and up.

2. In a type-writing machine, in combination, a carriage-frame, a rod on which said carriage-frame is arranged to rest and run back and forth, a spring secured to the carriage-frame and a roll in its free end to bear up against the under side of said rod for the purpose specified.

3. In a type-writing machine, a carriage-frame adapted to slide on suitable supports, two hook-arms pivoted thereto, a paper roll or platen frame adapted to be connected to said swinging hooks, and movable guards or latches on said swinging hook-arms to hold the paper roll or platen frame in connection therewith.

4. In a type-writing machine, a platen arranged to rotate in a suitable frame, a vertical swinging frame, to and on an arm of which above its pivot said platen-frame is supported, a rod connected to the other arm of said swinging frame, a lever engaging with said rod, and a lever engaging with said rod-lever and extending to the front of the machine for operation thereof.

5. In a type-writing machine, in combination, a paper roll or platen carriage, a swinging frame on which said carriage is supported, a rod connected thereto, an adjustable shoulder or block on said rod, a spring bearing on said rod to engage with said shoulder or block, two levers arranged to engage with said shoulder or block, one between said spring and the rod and two levers engaging with said levers respectively and extending to the front of the machine for operation thereof.

6. In a type-writing machine, a paper roll or platen carriage, a swinging frame on which said carriage is supported, a rod connected thereto, an adjustable shoulder or block on said rod, a spring bearing on said rod to engage with said shoulder or block, and a lever engaging with said lever and extending to the front of the machine for operation thereof.

7. In a type-writing machine, a paper roll or platen carriage, a swinging frame to which said carriage is connected and supported, a rod connected to said swinging frame, levers connected to said rod for operation thereof, and a spring connected to said rod and a screw in the supporting-frame and connected to said spring.

8. In a type-writing machine, a paper-roll carriage-frame, a swinging frame to which said carriage is connected and on which it is adapted to run, a bar secured to said carriage-frame, a swinging arm pivoted to said bar and a hook end on said arm to engage with the under side of a bar of said swinging frame.

9. In a type-writing machine, a paper or platen roll, a frame on which said platen is supported and adapted to rotate, a feed-roll bearing on said platen, spring-arms to which the feed-roll is pivoted, said spring-arms being connected to said frame, and a lever pivoted to a suitable support adapted to bear against the shaft of said feed-roll for the purpose specified.

10. In a type-writing machine, in combination, a swinging frame, a paper-platen frame connected to said frame, a rod connected to said frame and to means for operating said rod, a spring connected to said rod and to a screw adapted to screw in a suitable support.

11. In a type-writing machine, a paper roll or platen, a swinging frame on which said platen is supported, a rod connected to said swinging frame, a head or screw-nut on its outer end and a spring on said rod between said head and the frame supporting the parts of the machine.

12. In a type-writing machine, in combination, a paper roll or platen, a shaft to said platen, a flat strip extending along and over said roll, two scales on said strip, one on each edge, arms to said strip one to each end, extending down by the ends of the roll and attached to said shaft so as to rock thereon.

13. In a type-writing machine, in combination, a paper roll or platen adapted to turn in a suitable support, a gear on the end of said platen, a pawl engaging with said platen-gear, a lever pivoted to a suitable support adapted to operate said pawl and a hook on said lever, engaging with the under side of the arm of said pawl to insure its return after being operated by the lever.

14. In a type-writing machine, in combination, a paper roll or platen, a frame in which it is adapted to rotate, a carriage-frame on which said frame is supported, a swinging latch or hook pivoted to said carriage-frame adapted to engage with the said paper-platen frame, and a movable guard to said hook.

15. In a type-writing machine, in combination, a paper roll or platen, a frame in which it is adapted to rotate, a carriage-frame on which said frame is supported, a swinging latch or hook pivoted to said carriage-frame adapted to engage with the said paper-platen frame, and a movable guard to said hook, provided with arms embracing the sides of the hook to guide it in its movements, and a slot and screw passing through said slot and securing the guard to the hook.

16. In a type-writing machine, in combination, a paper roll or platen frame arranged on a suitable swinging support, a rod connected thereto, a cone or block on said rod adapted to screw thereon, a lever adapted to bear upon said cone for operation of said rod and a spring arranged to engage with said cone.

17. In a type-writing machine, in combination, a paper roll or platen frame arranged on a suitable swinging support, a rod connected thereto, an adjustable cone or block on said rod, a lever adapted to bear upon said cone for operation of the rod and a spring arranged to engage with said cone.

18. In a type-writing machine, in combination, a paper roll or platen adapted to rotate in a suitable frame, a curved plate pivoted to a rod of said frame, and extending partially around said platen, a feed-roll adapted to rotate in arms of said plate one at each end and in spring-arms secured to said frame.

19. In a type-writing machine, in combination, a finger-key pivoted to a suitable support having a concave bearing on its edge, a vertical wire having a transverse groove in its end the face of the groove being convex and adapted to fit said concave bearing, its sides extending over the sides of the key, a shoulder on said wire and a spring on said wire bearing on said shoulder and against a suitable support.

20. In a type-writing machine, in combination, a paper roll or platen, a shaft on which said platen is supported and adapted to rotate, a flat strip along said platen, arms to said strip attached to the shaft of said platen to rock thereon, a scale on said strip and a spring attached to said strip and to a support.

21. In a type-writing machine, in combination, a paper roll or platen, a shaft on which said platen is supported and adapted to rotate, a flat strip along said platen, arms to said strip attached to said platen-shaft to rock thereon, a scale on said strip, and a pointer or index for said scale secured to a suitable support.

22. In a type-writing machine, in combination, a paper roll or platen, a shaft on which said platen is supported and adapted to rotate, a flat strip along said platen, arms to said strip attached to said platen-shaft to rock thereon, a scale on said strip, and a spring on a suitable support to engage with said strip when moved forward.

23. In a type-writing machine, in combination, a rock-shaft, a plate secured thereto having two ratchet-teeth in its edge, a plate having a slot in one end pivoted to said shaft, a spring bearing on said pivoted plate, said pivoted plate having two ratchet-teeth on its edge, and adapted to move in guideways on said shaft, and a ratchet-tooth bar on a movable carriage-frame adapted to engage with the teeth of said plates.

24. In a type-writing machine, in combination, a rock-shaft, a horizontal bar connected to said shaft, a vertical rod connected to said bar, two antifriction-rolls pivoted to a suitable support, between which said vertical rod passes, and a lever pivoted to a suitable support arranged to operate said vertical rod.

25. In a type-writing machine, in combination, two spools arranged to turn on a suitable support, an ink-ribbon adapted to wind or run from one to the other, a lever pivoted to a suitable support, two spring pawls or fingers on said lever adapted by the swinging of the lever to engage with first one and then the other of said ribbon-spools, an arm or plate arranged to move back and forth on a suitable support, and adapted to engage with the ink-ribbon to move it sidewise in the operation of the arm or plate, said arm being connected to the lever for operation thereof.

26. In a type-writing machine, in combination, two spools adapted to turn on a suitable shaft and secured thereto, an ink-ribbon on said spools, and a plate between the two spools having spring radial arms.

27. In a type-writing machine, in combination, a type-bar adapted to swing on a pivot, a rod or support having a slot therein into which the type-bar projects in its operation, a spring secured to said support and projecting into said slot for the purpose specified.

28. In a type-writing machine, in combination, a pivoted type-bar, a spring secured to a suitable support and arranged to extend by its free end into an opening or slot in which the type-bar is moved as its type is printing.

29. In a type-writing machine, in combination, a pawl having a slot in one end and by such slot pivoted to a suitable support, a bearing for the free end of said pawl, a wire or stem to said pawl near its slot end extending backward therefrom, and a spring connected to the outer end of said wire and to a suitable support.

30. In a type-writing machine, in combination, a pawl having a slot in one end and by such slot pivoted to a suitable support, a bearing for the free end of said pawl, a wire or stem to said pawl near its slot end extending backward therefrom and a spring connected to the outer end of said wire, and extending diagonally back and connected to a suitable support.

31. In a type-writing machine, in combination, a finger-key pivoted to a suitable support having a concave bearing on its edge, a vertical wire or rod having a transverse groove in its end, the face of the groove being convex and adapted to fit said concave bearing, a shoulder on said rod and a spring bearing on said shoulder and against a suitable support.

In testimony whereof I have hereunto set my hand in the presence of two subscribing witnesses.

WALTER J. BARRON.

Witnesses:
 EDWIN W. BROWN,
 LEONA C. HENO.